April 4, 1961 L. E. HENYON 2,978,083
POSITIVE LOCK SYNCHRONIZER
Filed Nov. 7, 1957 2 Sheets-Sheet 1

INVENTOR.
LEWIS E. HENYON
BY
ATTYS.

April 4, 1961  L. E. HENYON  2,978,083
POSITIVE LOCK SYNCHRONIZER
Filed Nov. 7, 1957  2 Sheets-Sheet 2

INVENTOR.
LEWIS E. HENYON
BY
ATTYS.

United States Patent Office 2,978,083
Patented Apr. 4, 1961

2,978,083
POSITIVE LOCK SYNCHRONIZER

Lewis E. Henyon, Jackson, Mich., assignor to Clark Equipment Company, a corporation of Michigan Filed Nov. 7, 1957, Ser. No. 695,157

8 Claims. (Cl. 192—114)

My present invention relates to a clutch and synchronizer assembly for clutching either of a pair of gears to a shaft on which the gears are rotatably mounted, and particularly to a new and improved positive locking means in the synchronizer assembly to prevent movement of the assembly and disengagement thereof through tooth misalignment or torque surge.

Accordingly, a principal object of this invention is the improvement in clutch and synchronizer assemblies whereby the assembly is locked into engagement with one or more of the gears preventing any movement of the assembly axially in the event of tooth mis-alignment or torque surges.

In the form of clutch synchronizer assemblies such as disclosed and claimed in the U.S. Patent 2,667,955 to Bixby, in connection with which my present invention is described for purposes of illustration, an axially slidable clutch hub is mounted on a splined portion of a shaft on which a pair of axially spaced gears are rotatably mounted. The clutch hub is provided with jaw clutch teeth which are adapted to be disposed in engagement with jaw clutch teeth formed on the rotatable gears for positively clutching either one of the gears to the shaft. The clutch hub is formed with a radially extending clutch hub ring having a plurality of circumferentially spaced openings formed therethrough parallel to the shaft. Disposed through some of the openings in the clutch hub ring are a plurality of pins affixed at their ends to synchronizer rings having friction surfaces which are adapted to cooperate with friction surfaces on the aforementioned gears. The pins have reduced central portions which define shoulders adapted to cooperate with the edges of the opening in the clutch hub ring for blocking relative axial movement of the latter with respect to the synchronizer rings when they are rotating asynchronously. There is also provided a plurality of circumferentially spaced split pin assemblies disposed through the other of the openings in the clutch hub ring and which are received at their ends in the synchronizer rings. These split pin assemblies are formed with central annular grooves similar to the other pin and are biased into engagement with the peripheries of the openings by resilient means disposed between the portions of each of the split pin assemblies. Initial axial movement of the clutch hub ring will cause the synchronizer rings to move conjointly therewith by the split pin assemblies. After one of the synchronizer rings has been disposed in clutching engagement with the adjacent gear and the synchronous speed is obtained between the gear and the clutch hub, further axial movement of the clutch hub will cause the portions of the split pin assemblies to compress or collapse to effect snap engagement of the jaw clutch teeth of the clutch hub with the jaw clutch teeth of the gear.

In such assembly, as above described, the clutch hub is further provided with an unlocking key, slidable therewith, and having a radially extending bar formed to be integral with the clutch hub ring, but permitting a lost motion movement between the clutch hub and the unlocking key. After the jaw clutch teeth of the clutch hub and of the gears are in engagement, a centrifugally actuated key will move radially outwardly from the shaft and positively lock the synchronizer assembly in engagement. From the engaged position of the synchronizer assembly to move to its central or non-engaged position, the clutch hub ring is first moved causing the unlocking key to move so that a ramp or inclined plane formed thereon pushes the centrifugally actuated key radially inwardly, thus removing the positive lock for the clutch hub. When this action is complete, the clutch hub ring contacts the clutch hub and moves the same out of intermeshing engagement with the gear.

Accordingly, another object of this invention is to provide a centrifugally actuated positive lock in a synchronizer assembly which cooperates with the clutch hub to prevent disengagement of the assembly with the respective gear in the event of torque surges of tooth misalignment.

The above objects and more specific objects and advantages will be better understood upon reading the following description with reference to the accompanying drawings which form a part thereof and wherein.

Figure 1:
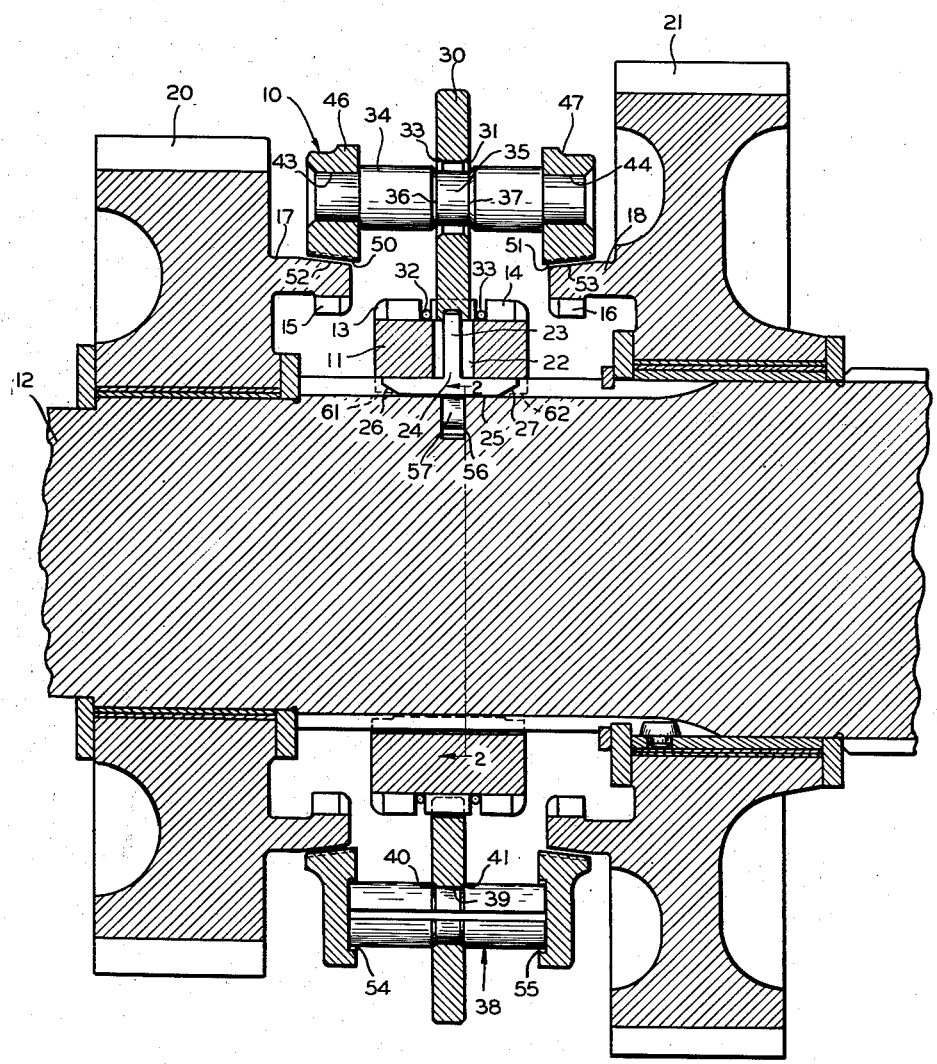
Fig. 1 is a vertical fragmentary sectional view showing a portion of a transmission incorporating a positive lock centrifugally actuated key constructed in accordance with my invention incorporated in a clutch and synchronizer assembly.

Referring now to the drawings, there is shown a preferred embodiment of my invention, illustrated as typically installed in a clutch and synchronizer assembly such as disclosed in U.S. Patent 2,667,955 to Bixby.

The clutch and synchronizer assembly, indicated in its entirety as 10, comprises a clutch hub 11 suitably splined on a shaft 12 for rotation therewith and adapted for axial movement therealong. The clutch hub 11 has external jaw clutch teeth, the axial extremities of which are indicated as 13 and 14 and which are adapted, respectively, to be selectively disposed in engagement with internal jaw clutch teeth 15 and 16, formed integrally with axially extending annular flange portions 17 and 18 of enlarged gears 20 and 21. Flange portions 17 and 18 face the clutch hub member 11. Clutch hub 11 is provided with a radially extending aperture or bore 22 centrally thereof in which is received a radially outwardly extending arm or bar 23 from a T-shaped unlocking key 24. Unlocking key 24 is provided with a bar 25 normal to the bar 23 slidable relative to the shaft 12 and provided at each end with inclined surfaces or ramps 26 and 27, the purpose of which will be explained hereinafter. It is to be noted that the diameter of the bore 22 of the clutch hub is greater than the outer diameter of the bar 23 to provide a lot motion connection between the unlocking key and the clutch hub 11.

At the radially outward extremity of the bar 23 of unlocking key 24, there is formed a clutch hub ring 30 having a plurality of circumferentially spaced openings 31, the axes of which are parallel to the axis of the shaft 12. Clutch hub ring 30 is also formed with internal teeth complementary to the external teeth of the clutch hub and is axially slidable on the clutch hub between the stop rings 32 and 33. The edges of the openings 31 are tapered outwardly as at 33 and have alternatively disposed therein, pin members 34 having central annular grooves 35 and tapered blocking shoulders 36 and 37. Disposed through the other alternate openings 31 are split pin assemblies 38 (see the lower portion of Fig. 1), having central annular grooves 39 and tapered shoulders 40 and 41. The split pin assemblies 38 preferably comprise semi-cylindrical segments or portions between which are disposed substantially ring-shaped spring metal clip members (not shown) adapted to bias the semi-cylindrical portions apart and normally urged the central annular grooves 39 into engagement with the inner peripheral surfaces of openings 31 formed in the clutch hub ring 30.

Pin members 34 have reduced end portions which are rigidly secured in any convenient manner within openings 43 and 44 formed in a pair of axially spaced synchronizer ring members 46 and 47, the latter having internal tapered friction surfaces 50 and 51 which cooperate, respectively, with external tapered friction surfaces 52 and 53 formed on axially extending annular flange portions 17 and 18 of the enlarged gears 20 and 21. Suitable circumferentially spaced recesses 54 and 55 are formed in the surfaces of the synchronizer ring members 46 and 47 facing the clutch hub ring and receive the ends of the split pin assemblies 38.

In practice, a conventional shift fork (not shown) is provided for effecting axial movement of the clutch hub ring 30 and upon rotation of the shaft 12, drive may be affected to the clutch synchronizer assembly 10. With the clutch and synchronizer assembly 10 in neutral position, as shown in Fig. 1, axial movement of the clutch hub ring to the left from the position shown in Fig. 1, may be effected by movement of the shift fork. Initial movement of the clutch hub ring 30 to the left carries unlocking key 24 fixedly connected thereto and the synchronizer rings 46 and 47 to the left, since the central annular grooves 39 of the split pin assemblies 38 are biased into engagement with the peripheries of the openings 31 in the clutch hub ring. Further axial movement of the clutch hub ring to the left causes internal tapered friction surface 50 of the synchronizer ring 46 to frictionally engage the external tapered friction surface 52 on axially extending flange portion 17 of gear 20, and causes the clutch hub ring itself to engage the stop ring 32. Slip occurs during initial engagement of the tapered friction surfaces 50 and 52 and thus the gear 20 and synchronizer ring 46 rotate asynchronously. During the initial engagement, the shoulders 36 of pins 34 are disposed in blocking relation with respect to the edges of the adjacent openings 31 which prevent axial movement of the clutch hub ring relative to the synchronizer rings 46 and 47. After the tapered friction surfaces 50 and 52 have been fully engaged and they rotate synchronously, the shoulders 36 on pins 34 no longer block axial movement of the clutch hub ring relative to the synchronizer rings.

Initial engagement of the clutch hub ring against the stop ring 32 to axial movement of the clutch hub ring relative to the synchronizer rings 46 and 47 causes portions of the split pin assemblies 38 to compress or collapse, which cocks the latter and effects a snap engagement of the jaw clutch teeth 13 with the jaw clutch teeth 15 of gear 20, since further axial movement of the clutch hub ring carries with it the clutch hub 11 by contact thereof with the stop ring 32, thus providing positive direct drive between the gear 20 and shaft 12.

In like manner, the clutch hub ring 30 may be moved axially to the right from the position shown in Fig. 1, with operation of the shift fork (not shown). Since the engagement of the jaw clutch teeth 14 of the clutch hub with the jaw clutch teeth 16 of the gear 21 is effected in the same manner as above described, it is believed that a detailed description thereof is unnecessary. When engagement of the jaw clutch teeth 14 and 16 is accomplished, a drive connection between shaft 12 and gear 21 is effected.

Figure 2:
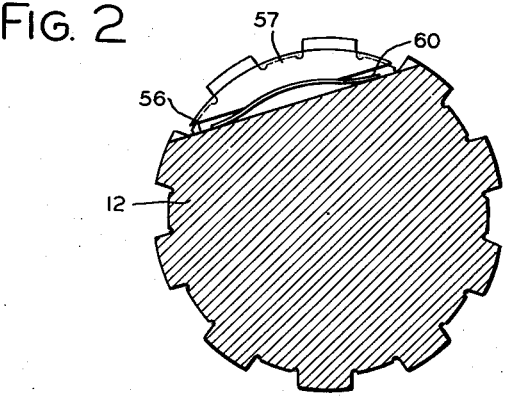
Fig. 2 is a cross-sectional view taken along line 2—2 of Fig. 1 and showing to advantage the centrifugally key assist spring and the positive lock centrifugally actuated key.
Figure 3:
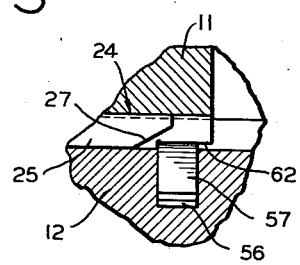
Fig. 3 is an enlarged fragmentary view of the positive lock centrifugally actuated key in the fully locked up position.
Figure 4:
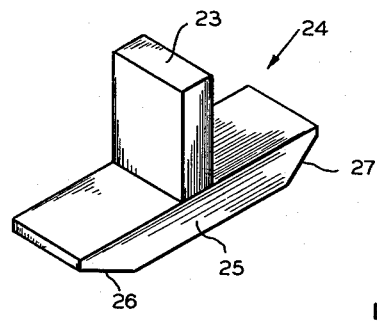
Fig. 4 is an enlarged perspective view of the unlocking key for use with my positive lock centrifugally actuated key.

As hereinbefore mentioned, an outstanding feature of this invention is the positive lock provided in the clutch and synchronizer assembly of the type herein described to prevent the disengagement of the clutch and synchronizer assembly from the respective gear that may be caused by torque surges or misalignment of gear teeth in the transmission assembly. In order to effect this function, the shaft 12 is provided with a groove 56, which as shown in Figure 2, extends transversely and inwardly of a portion of the periphery of shaft 12. The groove 56 may be referred to as a chordal groove in that its base extends transversely of shaft 12 like the chord of a circle. The chordal groove 56 receives positive locking key 57 having a complementary portion fitting in the groove for radial movement inwardly and outwardly thereof but having a radial dimension slightly less than the depth of the groove 56. Disposed between the bottom or base of the chordal groove 56 and the radially inner side of key 57 is a centrifugal assist spring in the form of a leaf spring 60 adapted to aid the centrifugal force in urging the key 57 radially outwardly to seat in notches 61 and 62 formed in the internal splines of the clutch hub near the respective ends thereof (see Fig. 3).

As can be seen, upon initial movement of the clutch hub ring, as hereinabove explained, T-shaped unlocking key 24 is moved to the left (as viewed in Fig. 1). When the clutch hub ring is in driving engagement by the intermeshing of the jaw clutch teeth 13 and 15, and unlocking key 24 is in its extreme left position, the key 57, by operation of the centrifugal force, will be urged radially outwardly in locking relationship with notch 62 where it will remain, regardless of any torque surges or any misalignment of teeth.

When it is desired to disengage the driving relationship between the gear 20 and the clutch and synchronizer assembly 10, the movement of the clutch hub ring to the right as shown in the drawings, until the bar 23 of unlocking key 24 is in engagement with the right side of the radial bore 22 in the clutch hub, at which time the ramp or inclined surface 27 of the unlocking key 24 has urged the centrifugally actuated key 57 radially inwardly against the centrifugal force and the force due to the spring 60. With the positive lock key 57 returned to its original position, the synchronizer assembly is then free to return to its neutral position such as shown in Fig. 1.

In like manner, positive lock key 57 cooperates with the inclined surface or ramp 26 and notch 61 if it is desired to disengage the clutch and synchronizer assembly from gear 21.

While I have shown and described my preferred embodiment with reference to a particular direction and in connection with a particular application in a synchronizer assembly, it is to be understood that this embodiment is but by way of illustration and not by way of limitation, and the scope of this invention is defined solely by the appended claims which should be construed as broadly as the prior art will permit.

I claim:

1. In a transmission a shaft having splines, a gear rotatably mounted on said shaft, a clutch hub member splined for rotation with said shaft and for movement axially relative thereto from a neutral position to a shifted position at which said gear is drivingly connected with said shaft, and a clutch ring member for moving said clutch hub member axially of said shaft, the combination of locking means comprising, groove means in the splined portion of said shaft extending transversely and inwardly of the periphery thereof, a locking key mounted in said groove in said shaft for radial movement inwardly and outwardly of the periphery thereof, an unlocking key connected with said clutch ring member for conjoint movement therewith axially of said shaft, said unlocking key in the neutral position of said clutch hub member overlying said locking key and retaining the latter in said groove within the periphery of said shaft, and said locking key in the shifted position of said clutch hub member being adapted to be disposed by centrifugal force on rotation of said shaft to a position radially outwardly of the periphery of said shaft to prevent axial movement of said clutch hub member from its shifted position to its neutral position.

2. In a transmission a shaft having splines, a gear rotatably mounted on said shaft, a clutch hub member splined for rotation with said shaft and for movement axially relative thereto from a neutral position to a shifted position at which said gear is drivingly connected with said shaft, a clutch ring member for moving said clutch hub member axially of said shaft, and synchronizer means associated with said clutch ring member and said rotatable gear, the combination of locking means comprising, groove means in the splined portion of said shaft extending transversely and inwardly of the periphery thereof, a locking key mounted in said groove means in said shaft for radial movement inwardly and outwardly of the periphery thereof, an unlocking key connected with said clutch ring member for conjoint movement therewith axially of said shaft, said unlocking key in the neutral position of said clutch hub member overlying said locking key and retaining the latter in said groove within the periphery of said shaft, lost motion connecting means between said unlocking key and said clutch hub member for engaging said unlocking key with said locking key to dispose the latter inwardly of said groove means upon movement of said clutch ring member in a direction for shifting said clutch hub member from its shifted position to its neutral position, and said locking key in the shifted position of said clutch hub member being adapted to be disposed by centrifugal force on rotation of said shaft to a position radially outwardly of the periphery of said shaft to prevent axial movement of said clutch hub member from its shifted position to its neutral position.

3. In a transmission shaft having splines, a gear rotatably mounted on said shaft, a clutch hub member splined for rotation with said shaft and for movement axially relative thereto from a neutral position to a shifted position at which said gear is drivingly connected with said shaft, and a clutch ring member for moving said clutch hub member axially of said shaft, the combination of locking means comprising, chordal groove means in the splined portion of said shaft extending transversely and inwardly of the periphery thereof, a locking key mounted in said chordal groove means for inward and outward radial movement, an unlocking key connected with said clutch ring member for conjoint movement therewith axially of said shaft, said unlocking key in the neutral position of said clutch hub member overlying said locking key and retaining the latter in said chordal groove within the periphery of said shaft, and said locking key in the shifted position of said clutch hub member being adapted to be disposed by centrifugal force on rotation of said shaft to a position radially outwardly of the periphery of said shaft to prevent axial movement of said clutch hub member from its shifted position to its neutral position.

4. In a transmission a shaft having splines, a gear rotatably mounted on said shaft, a clutch hub member splined for rotation with said shaft and for movement axially relative thereto from a neutral position to a shifted position at which said gear is drivingly connected with said shaft, a clutch ring member for moving said clutch hub member axially of said shaft, and synchronizer means associated with said clutch ring member and said rotatable gear, the combination of locking means comprising, chordal groove means in the splined portion of said shaft extending transversely and inwardly of the periphery thereof, a locking key mounted in said chordal groove means for inward and outward radial movement, an unlocking key connected with said clutch ring member for conjoint movement therewith axially of said shaft, said unlocking key in the neutral position of said clutch hub member overlying said locking key and retaining the latter in said groove within the periphery of said shaft, lost motion connecting means between said unlocking key and said clutch hub member for engaging said unlocking key with said locking key to dispose the latter inwardly of said groove means upon movement of said clutch ring member in a direction for shifting said clutch hub member from its shifted position to its neutral position, and said locking key in the shifted position of said clutch hub member being adapted to be disposed by centrifugal force on rotation of said shaft to a position radially outwardly of the periphery of said shaft to prevent axial movement of said clutch hub member from its shifted position to its neutral position.

5. In a transmission a shaft having a splined portion, a gear rotatably mounted on said shaft, a clutch hub member connected with said splined portion of said shaft for rotation therewith and for movement axially relative thereto from a neutral position to a shifted position at which said gear is drivingly connected with said shaft, and a clutch ring member for moving said clutch hub member axially of said shaft, the combination of locking means comprising chordal groove means in the splined portion of said shaft extending transversely and inwardly of the periphery thereof, a locking key having a portion conforming to and disposed in said chordal groove, said locking key being movable radially inwardly and outwardly of said chordal groove, an unlocking key having a portion slidable in the splines of said shaft and connected with said clutch ring member for conjoint movement therewith axially of said shaft, said unlocking key in the neutral position of said clutch hub member overlying said locking key and retaining the latter in said groove within the periphery of said shaft, and said locking key in the shifted position of said clutch hub member being adapted to be disposed by centrifugal force on rotation of said shaft to a position radially outwardly of the periphery of said shaft to prevent axial movement of said clutch hub member from its shifted position to its neutral position.

6. In a transmission a shaft having a splined portion, a gear rotatably mounted on said shaft, a clutch hub member connected with said splined portion of said shaft for rotation therewith and for movement axially relative thereto from a neutral position to a shifted position at which said gear is drivingly connected with said shaft, a clutch ring member for moving said clutch hub member axially of said shaft, and synchronizer means associated with said clutch ring gear and said rotatable gear, the combination of locking means comprising chordal groove means in the splined portion of said shaft extending transversely and inwardly of the periphery thereof, a locking key having a portion conforming to and disposed in said chordal groove, said locking key being movable radially inwardly and outwardly of said chordal groove, an unlocking key having a portion slidable in the splines of said shaft and connected with said clutch ring member for conjoint movement therewith axially of said shaft, said unlocking key in the neutral position of said clutch hub member overlying said locking key and retaining the latter in said groove within the periphery of said shaft, lost motion connecting means between said unlocking key and said clutch hub member for engaging said unlocking key with said locking key to dispose the latter inwardly of said groove means upon movement of said clutch ring member in a direction for shifting said clutch hub member from its shifted position to its neutral position, and said locking key in the shifted position of said clutch hub member being adapted to be disposed by centrifugal force on rotation of said shaft to a position radially outwardly of the periphery of said shaft to prevent axial movement of said clutch hub member from its shifted position to its neutral position.

7. In a transmission a shaft having a splined portion, a gear rotatably mounted on said shaft, a clutch hub member connected with said splined portion of said shaft for rotation therewith and for movement axially relative thereto from a neutral position to a shifted position at which said gear is drivingly connected with said shaft, and a clutch ring member for moving said clutch hub member axially of said shaft, the combination of locking means comprising chordal groove means in the splined portion of said shaft extending transversely and inwardly of the periphery thereof, a locking key having a portion conforming to and disposed in said chordal groove, said locking key being movable radially inwardly and outwardly of said chordal groove, an unlocking key having a first portion slidable in the splines of said shaft, and a second portion extending radially outwardly from said first portion and connected with said clutch ring member to afford for conjoint movement of said unlocking key axially of said shaft with said clutch ring member, said unlocking key in the neutral position of said clutch hub member overlying said locking key and retaining the latter in said groove within the periphery of said shaft, and said locking key in the shifted position of said clutch hub member being adapted to be disposed by centrifugal force on rotation of said shaft to a position radially outwardly of the periphery of said shaft to prevent axial movement of said clutch hub member from its shifted position to its neutral position.

8. In a transmission a shaft having a splined portion, a gear rotatably mounted on said shaft, a clutch hub member connected with said splined portion of said shaft for rotation therewith and for movement axially relative thereto from a neutral position to a shifted position at which said gear is drivingly connected with said shaft, a clutch ring member for moving said clutch hub member axially of said shaft, and synchronizer means associated with said clutch ring gear and said rotatable gear, the combination of locking means comprising chordal groove means in the splined portion of said shaft extending transversely and inwardly of the periphery thereof, a locking key having a portion conforming to and disposed in said chordal groove, said locking key being movable radially inwardly and outwardly of said chordal groove, an unlocking key having a first portion slidable in the splines of said shaft, and a second portion extending radially outwardly from said first portion and connected with said clutch ring member to afford for conjoint movement of said unlocking key axially of said shaft with said clutch ring member, said unlocking key in the neutral position of said clutch hub member overlying said locking key and retaining the latter in said groove within the periphery of said shaft, lost motion connecting means afforded by said second portion of said unlocking key extending through opening means in said clutch hub member for engaging said unlocking key with said locking key to dispose the latter inwardly of said groove means upon movement of said clutch ring member in a direction for shifting said clutch hub member from its shifted position to its neutral position, and said locking key in the shifted position of said clutch hub member being adapted to be disposed by centrifugal force on rotation of said shaft to a position radially outwardly of the periphery of said shaft to prevent axial movement of said clutch hub member from its shifted position to its neutral position.

References Cited in the file of this patent

UNITED STATES PATENTS

| | | |
|---|---|---|
| 2,521,730 | Keese | Sept. 12, 1950 |
| 2,667,955 | Bixby | Feb. 2, 1954 |
| 2,735,528 | Dodge | Feb. 21, 1956 |
| 2,785,783 | Homrig et al. | Mar. 19, 1957 |